United States Patent
Sawai

(10) Patent No.: US 8,805,287 B2
(45) Date of Patent: Aug. 12, 2014

(54) COMMUNICATION CONTROL METHOD, COMMUNICATION SYSTEM, AND MANAGEMENT SERVER

(75) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 169 days.

(21) Appl. No.: 13/580,989

(22) PCT Filed: Feb. 21, 2011

(86) PCT No.: PCT/JP2011/053712
§ 371 (c)(1),
(2), (4) Date: Aug. 24, 2012

(87) PCT Pub. No.: WO2011/122166
PCT Pub. Date: Oct. 6, 2011

(65) Prior Publication Data
US 2012/0322388 A1    Dec. 20, 2012

(30) Foreign Application Priority Data

Mar. 29, 2010  (JP) .................................. 2010-075335

(51) Int. Cl.
| | |
|---|---|
| H04B 15/00 | (2006.01) |
| H04W 16/28 | (2009.01) |
| H04B 17/00 | (2006.01) |

(52) U.S. Cl.
CPC ...................................... H04W 16/28 (2013.01)
USPC ........................................ 455/63.4; 455/67.11

(58) Field of Classification Search
CPC ............................. H04W 16/28; H01Q 3/2611
USPC .............................................. 455/63.4, 67.11
See application file for complete search history.

(56) References Cited

U.S. PATENT DOCUMENTS

| | | | |
|---|---|---|---|
| 2002/0111191 A1* | 8/2002 | Takatori et al. | ............... 455/562 |
| 2009/0117911 A1 | 5/2009 | Molisch et al. | |
| 2009/0137221 A1 | 5/2009 | Nanda et al. | |
| 2009/0252099 A1 | 10/2009 | Black et al. | |

FOREIGN PATENT DOCUMENTS

| | | |
|---|---|---|
| JP | 2009-159452 A | 7/2009 |
| JP | 2009-542043 A | 11/2009 |
| WO | WO 2009/057400 A2 | 5/2009 |
| WO | WO 2009/070606 A2 | 6/2009 |

OTHER PUBLICATIONS

International Search Report issued Mar. 29, 2011 in PCT/JP2011/053712.

* cited by examiner

*Primary Examiner* — Lee Nguyen
(74) *Attorney, Agent, or Firm* — Oblon, Spivak, McClelland, Maier & Neustadt, L.L.P.

(57) ABSTRACT

Provided is a communication control method including: determining whether or not reception quality of a second reception device satisfies a predetermined reference in a communication system including a first transmission device, a first reception device, a second transmission device secondarily using a frequency having been assigned to the first transmission device, and the second reception device; and, when it is determined that the reception quality of the second reception device does not satisfy the predetermined reference, additionally performing reception beam steering by the first reception device, beam steering by the first transmission device, reception beam steering by the second reception device, or transmission beam steering by the second transmission device in a predetermined order.

10 Claims, 7 Drawing Sheets

FIG. 2

| | IF WITH MACRO-CELL BASE STATION | ACCESS | LOCATION ASSUMED FOR DISPOSITION |
|---|---|---|---|
| RRH CELL BASE STATION | OPTICAL FIBER | OPEN TO ALL COMMUNICATION TERMINALS | OUTDOORS |
| HOT ZONE BASE STATION | X2 | OPEN TO ALL COMMUNICATION TERMINALS | OUTDOORS |
| FEMTO-CELL BASE STATION | X2 TUNNELING PROTOCOL IN PBN | CLOSED GROUP | INDOORS |
| RELAY DEVICE (RELAY BASE STATION) | WIRELESS (SO-CALLED, RELAY LINK) | OPEN TO ALL COMMUNICATION TERMINALS | OUTDOORS |

COMMUNICATION CONTROL METHOD, COMMUNICATION SYSTEM, AND MANAGEMENT SERVER

TECHNICAL FIELD

The present invention relates to a communication control method, a communication system, and a management server.

BACKGROUND ART

Recently, a heterogeneous network has been suggested as the next-generation communication network. This heterogeneous network is a network in which a plurality of kinds of small-or-medium-scale base stations coexist in a macro-cell by performing underlay transmission or spectrum sharing. A Remote RadioHead (RRH) cell base station, a hot zone base station (Pico/micro-cell eNB), a femto-cell base station (Home eNB), a relay device (relay base station), and the like are referred to as small-or-medium-scale base stations.

Such a heterogeneous network has a problem that, when different base stations such as a macro-cell base station and a femto-cell base station use the same frequency, improvement in area capacity is degraded by occurrence of interference. In this connection, for example, Patent Literature 1 and Patent Literature 2 disclose technologies for the problem of interference between different transmission devices.

CITATION LIST

Patent Literature

Patent Literature 1: Japanese Unexamined Patent Application Publication No. 2009-159452
Patent Literature 2: Japanese Unexamined Patent Application Publication (Translation of PCT application) No. 2009-542043

SUMMARY OF INVENTION

Technical Problem

When a transmission device transmits a radio signal to a reception device by beam steering, it is possible to suppress a case in which the radio signal becomes an interference wave for another reception device, and thus beam steering is useful as interference-avoidance control for increasing area capacity. However, calibration is necessary for the transmission device to perform the beam steering, and there is a problem that overhead increases.

Here, the present invention has been achieved in consideration of these problems, and is intended to provide a new and improved communication control method, communication system and management server that can achieve improvement in area capacity by suppressing a case of performing transmission beam steering.

Solution to Problem

According to the first aspect of the present invention in order to achieve the above-mentioned object, there is provided a communication control method including: determining whether or not reception quality of a second reception device satisfies a predetermined reference in a communication system including a first transmission device, a first reception device, a second transmission device secondarily using a frequency having been assigned to the first transmission device, and the second reception device; and when it is determined that the reception quality of the second reception device does not satisfy the predetermined reference, additionally performing reception beam steering by the first reception device, beam steering by the first transmission device, reception beam steering by the second reception device, or transmission beam steering by the second transmission device in a predetermined order.

The predetermined order may be an order of the reception beam steering by the second reception device, the transmission beam steering by the second transmission device, the reception beam steering by the first reception device, and the beam steering by the first transmission device.

The predetermined order may be an order of the reception beam steering by the second reception device, the reception beam steering by the first reception device, the transmission beam steering by the second transmission device, and the beam steering by the first transmission device.

The reception beam steering by the second reception device may be reception null-steering in a direction-of-arrival of a radio signal transmitted from the first transmission device.

The transmission beam steering by the second transmission device may be transmission null-steering in a direction-of-presence of the first reception device.

The reception beam steering by the first reception device may be reception null-steering in a direction-of-arrival of a radio signal transmitted from the second transmission device.

The transmission beam steering by the first transmission device may be transmission null-steering in a direction-of-presence of the second reception device.

When reception quality of the first reception device is higher than a predetermined reference due to additional performance of the reception beam steering by the first reception device, transmission power of a radio signal from the first transmission device to the first reception device may be reduced within a range in which the reception quality of the first reception device is not lower than a predetermined reference.

When reception quality of the first reception device is higher than a predetermined reference due to additional performance of the reception beam steering by the first reception device, transmission power of a radio signal from the second transmission device to the second reception device may be increased within a range in which the reception quality of the first reception device is not lower than a predetermined reference.

According to the second aspect of the present invention in order to achieve the above-mentioned object, there is provided a communication system including: a first management server for managing communication between a first transmission device and a first reception device; and a second management server for managing communication between a second transmission device, which secondarily uses a frequency having been assigned to the first transmission device, and a second reception device, in which the second management server determines whether or not reception quality of the second reception device satisfies a predetermined reference in a communication system including the first transmission device, the first reception device, the second transmission device secondarily using the frequency having been assigned to the first transmission device, and the second reception device, and in which, when it is determined that the reception quality of the second reception device does not satisfy the predetermined reference, the first management server or the second management server additionally performs reception beam steering by the first reception device, beam steering by the first transmission device, reception beam steering by the second reception device, or transmission beam steering by the second transmission device in a predetermined order.

Advantageous Effects of Invention

According to the present invention as described above, it is possible to achieve improvement in area capacity by suppressing a case of performing transmission beam steering.

BRIEF DESCRIPTION OF DRAWINGS

FIG. 2 is an explanatory diagram showing an outline of each small-or-medium-scale base station.

DESCRIPTION OF EMBODIMENTS

Figure 1:
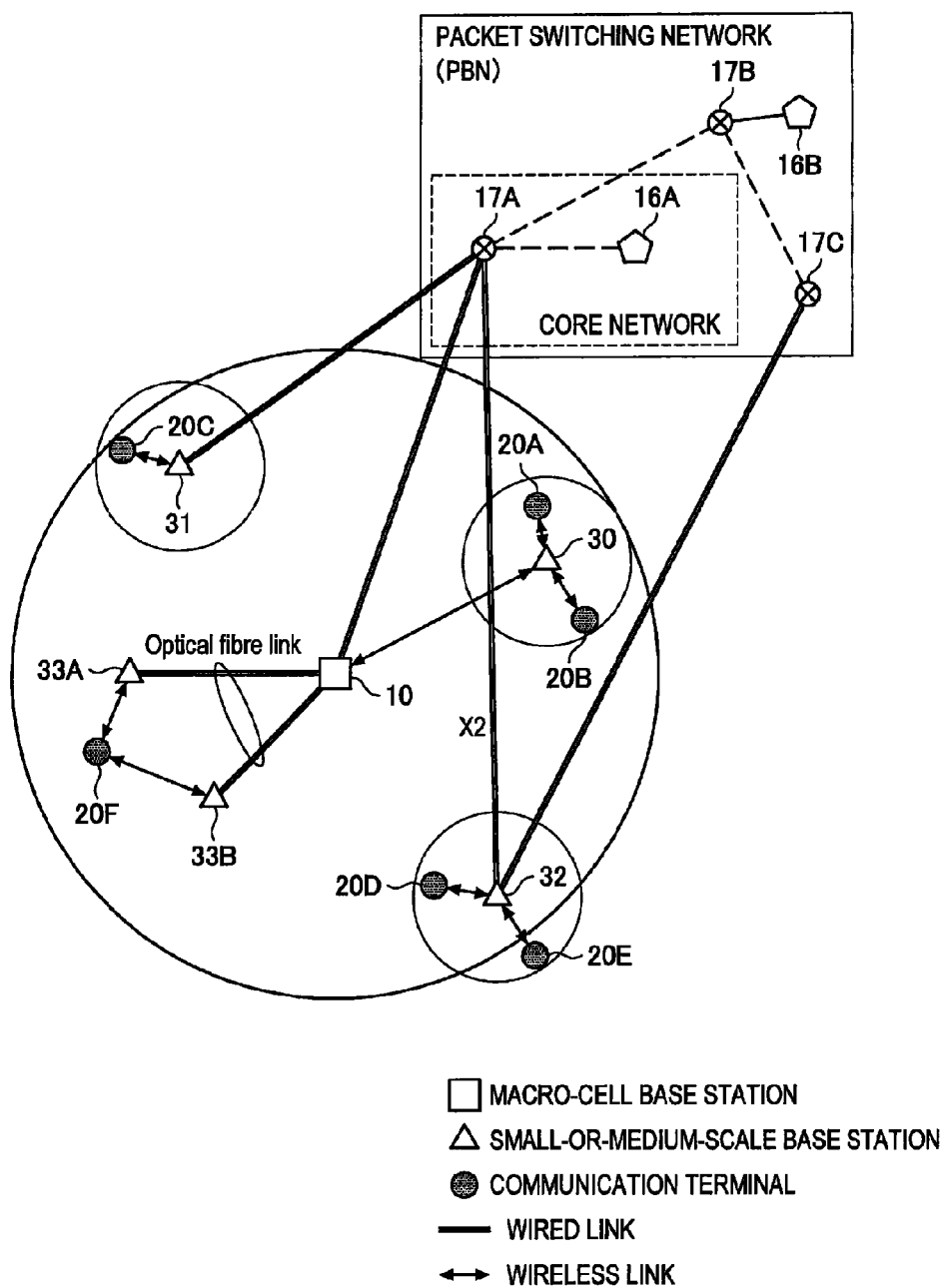
FIG. 1 is an explanatory diagram showing an example of a configuration of a heterogeneous network.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

In addition, in this specification and the drawings, a plurality of elements having substantially the same functional configuration may be distinguished from each other by each having a different letter added to the same reference numeral. For example, a plurality of elements having substantially the same functional configuration are distinguished from each other as communication terminals 20A, 20B, and 20C, if necessary. However, if it is not particularly necessary to distinguish each of a plurality of elements having substantially the same functional configuration, only the same reference numeral is assigned. For example, if it is not particularly necessary to distinguish the communication terminals 20A, 20B, and 20C, they are simply referred to as the communication terminal 20.

According to an order of items shown below, "Embodiments for Implementing Invention" will be described.

1. Example of Configuration of Heterogeneous Network
2. Outline of Embodiments of Present Invention
3. Methods of Performing Respective Beam Steering Operations
4. First Embodiment of Present Invention
5. Second Embodiment of Present Invention
6. Conclusion Example of Configuration of Heterogeneous Network 1. Example of Configuration of Heterogeneous Network An embodiment of the present invention can be applied to, for example, a communication system in which a plurality of local networks coexist using the same frequency. An example of such a communication system is a heterogeneous network.

The heterogeneous network is a network in which a plurality of kinds of small-or-medium-scale base stations coexist in a macro-cell by performing underlay transmission or spectrum sharing. A Remote RadioHead (RRH) cell base station, a hot zone base station (Pico/micro-cell eNB), a femto-cell base station (Home eNB), a relay device (relay base station), and the like are referred to as small-or-medium-scale base stations. Here, underlay transmission is a form of transmission in which transceivers present within a range at which the transceivers interfere with mutual communication links perform communication using the same frequency channel. A transmitter on a side that secondarily uses a frequency according to underlay transmission needs to adjust an extra interference level in order not to cause fatal interference in a communication link of a primary user. A configuration of a heterogeneous network will be described in detail below.

FIG. 1 is an explanatory diagram showing an example of a configuration of a heterogeneous network. As shown in FIG. 1, a heterogeneous network includes a macro-cell base station 10 (which has the same meaning as a base station 10), a relay device 30, a hot zone base station 31, a femto-cell base station 32, RRH cell base stations 33, and management servers 16A and 16B.

The management server 16A receives management information indicating a state of a cell formed by the macro-cell base station 10 from each base station 10, and controls communication in a cell formed by each base station 10 on the basis of the management information. Likewise, the management server 16B receives management information indicating a state of a cell formed by the femto-cell base station 32 from the femto-cell base station 32, and controls communication in the cell formed by the femto-cell base station 32 on the basis of the management information. Also, the management servers 16A and 16B have functions for the macro-cell base station 10 and a small-or-medium-scale base station to operate in cooperation. Functions of the management servers 16 may be installed in the macro-cell base station 10 or some small-or-medium-scale base stations. Also, the management servers 16 may have functions of Mobile Management Entities (MMEs) or gateway devices.

The macro-cell base station 10 manages small-or-medium-scale base stations and communication terminals 20 in a macro-cell. For example, the macro-cell base station 10 manages communication between the relay device 30 and the communication terminals 20 present in the cell formed by the macro-cell base station 10. For example, the macro-cell base station 10 manages scheduling information for communication between the relay device 30 and the communication terminals 20 present in the cell.

The hot zone base station 31 (pico-cell base station and micro-cell base station) has lower maximum transmission power than the macro-cell base station 10, and communicates with the macro-cell base station 10 using an interface such as X2, S1 and the like of a core network. In addition, the hot zone base station 31 forms an Open Subscriber Group (OSG) that can be accessed from any of the communication terminals 20.

The femto-cell base station 32 has lower maximum transmission power than the macro-cell base station 10, and communicates with the macro-cell base station 10 using a packet switching network such as ADSL. Alternatively, the femto-cell base station 32 can also communicate with the macro-cell base station 10 through a wireless link. In addition, the femto-cell base station 32 forms a Closed Subscriber Group (CSG) that can be accessed from the limited communication terminals 20 only.

The RRH cell base stations 33 are connected with the macro-cell base station 10 through optical fibers. For this reason, the macro-cell base station 10 can transmit a signal to the RRH cell base stations 33A and 33B disposed in different geographical locations through the optical fibers, and cause the radio signal to be transmitted from the RRH cell base stations 33A and 33B. For example, only an RRH cell base station 33 close to the location of a communication terminal 20 can be used. In addition, functions of a control system are installed in the macro-cell base station 10 to select an optimum transmission form according to distribution of the communication terminals 20.

Outlines of the respective small-or-medium-scale base stations described above are shown in FIG. 2. These small-or-medium-scale base stations such as the hot zone base station 31 and the femto-cell base station 32 may increase the total capacity by secondarily using a frequency used by the macro-cell base station 10.

For example, when the femto-cell base station 32 transmits a radio signal to a communication terminal 20D by performing transmission beam steering, it is possible to suppress the amount of interference that is imposed on other communication in the macro-cell by the femto-cell base station 32, and thus the total capacity in the whole macro-cell can be increased. However, calibration is necessary for the femto-cell base station 32 to perform transmission beam steering, and there is a problem that overhead increases.

Here, embodiments of the present invention have been created based on the above fact. According to the embodiments of the present invention, it is possible to achieve improvement in area capacity by suppressing cases of performing transmission beam steering. Such embodiments of the present invention will be described below.

2. Outline of Embodiments of Present Invention

First, a configuration of a communication system 1 according to an embodiment of the present invention, which can be applied to the above-described heterogeneous network, will be described with reference to FIG. 3.

Figure 3:
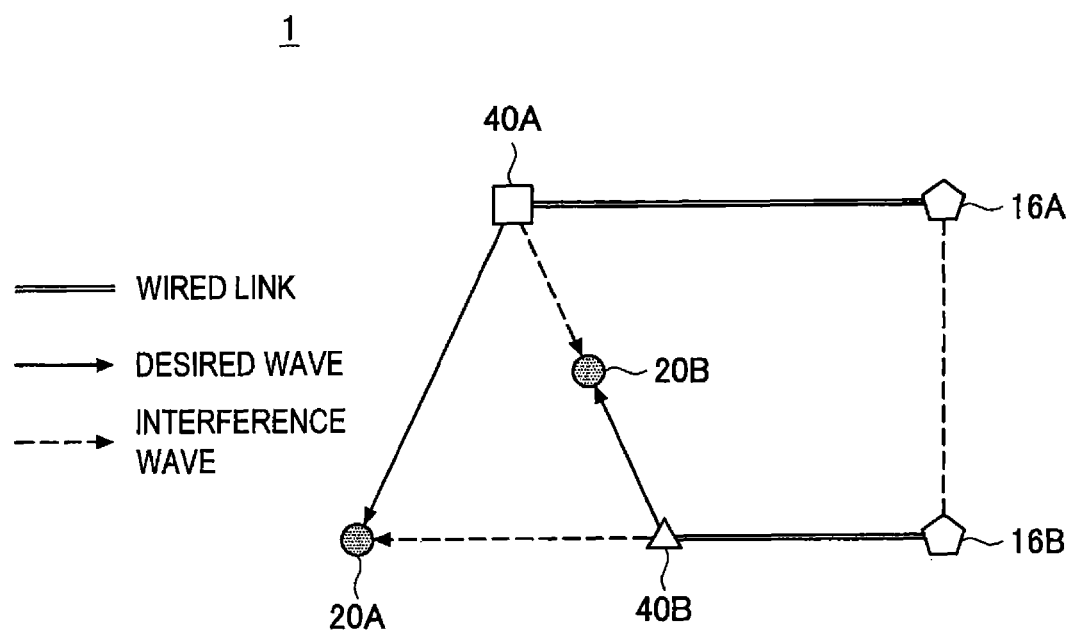
FIG. 3 is an explanatory diagram showing an example of a configuration of a communication system according to an embodiment of the present invention.

FIG. 3 is an explanatory diagram showing an example of a configuration of a communication system 1 according to an embodiment of the present invention. As shown in FIG. 3, the communication system 1 according to the embodiment of the present invention includes a management server 16A (first management server), a management server 16B (second management server), a reception device 20A (first reception device), a reception device 20B (second reception device), a transmission device 40A (first transmission device), and a transmission device 40B (second transmission device). Here, the reception device 20A and the reception device 20B correspond to, for example, the respective communication terminals 20 shown in FIG. 1, the transmission device 40A corresponds to, for example, the macro-cell base station 10 shown in FIG. 1, and the transmission device 40B corresponds to, for example, the femto-cell base station 32 shown in FIG. 1.

The management server 16A implements a first communication service by controlling communication between the transmission device 40A and the reception device 20A, and the management server 16B implements a second communication service by controlling communication between the transmission device 40B, which uses the same frequency as the transmission device 40A, and the reception device 20B.

In this communication system 1, as shown in FIG. 3, a radio signal transmitted from the transmission device 40A acts as an interference wave for the communication terminal 20B, and a radio signal transmitted from the transmission device 40B acts as an interference wave for the communication terminal 20A.

Here, when it is desired to improve reception quality of the reception device 20B, the management server 16B causes some devices to additionally perform transmission beam steering or reception beam steering in a predetermined order, thereby achieving improvement in the reception quality of the reception device 20B.

Specifically, the management server 16B determines whether or not the reception quality of the reception device 20B satisfies a predetermined reference, and causes reception beam steering by the reception device 20A, reception beam steering by the reception device 20B, transmission beam steering by the transmission device 40A and transmission beam steering by the transmission device 40B in a predetermined order. Due to this configuration, it is possible to obtain the reception quality of the reception device 20B that satisfies the predetermined reference while suppressing cases of performing transmission beam steering.

Here, reception beam steering by the reception device 20A is reception null-steering in a direction-of-arrival of the radio signal transmitted from the transmission device 40B. Likewise, reception beam steering by the reception device 20B is reception null-steering in a direction-of-arrival of the radio signal transmitted from the transmission device 40A.

Also, transmission beam steering by the transmission device 40A is transmission null-steering in a direction-of-presence of the reception device 20B. Likewise, transmission beam steering by the transmission device 40B is transmission null-steering in a direction-of-presence of the reception device 20A.

A method of performing each of these beam steering operations will be described below prior to descriptions of a first embodiment and a second embodiment.

3. Methods of Performing Respective Beam Steering Operations (Reception Beam Steering by Reception Device 20A)

On the basis of an instruction from the management server 16A or 16B, the reception device 20A performs reception beam steering for suppressing a reception level of an interference wave from the transmission device 40B according to, for example, a method described below.

First, the management server 16A assigns a slot through which the reception device 20A and the transmission device 40B perform communication for beamforming to the reception device 20A, and requests the management server 16B to assign the slot to the transmission device 40B.

The reception device 20A receives a preamble signal, a pilot signal or a reference signal transmitted from the transmission device 40B through the assigned slot, and acquires a channel matrix indicating a propagation path response between the reception device 20A and the transmission device 40B. The reception device 20A may construct a covariance matrix using the transmission signal from the transmission device 40B and use the covariance matrix as the channel matrix.

Using a direction-of-arrival estimation algorithm, such as MUSIC, and cyclostationary, the reception device 20A estimates a direction-of-arrival of the interference wave and a feature quantity of the signal, and performs reception beam steering by which a null is steered in the direction-of-arrival of the interference wave.

Figure 4:
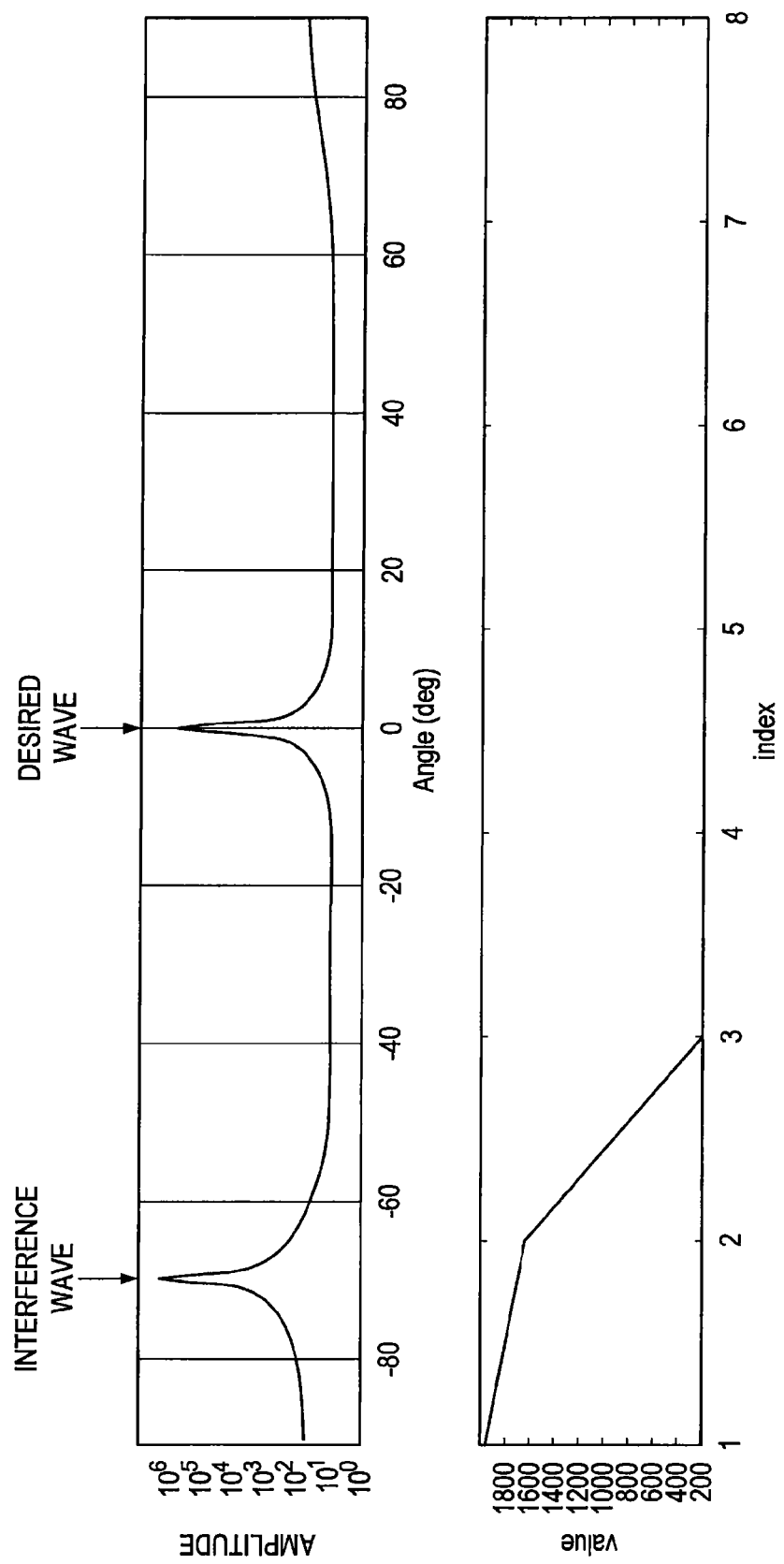
FIG. 4 is an explanatory diagram showing an example of a result of estimating a direction of arrival using MUSIC.

FIG. 4 is an explanatory diagram showing an example of a result of estimating a direction of arrival using MUSIC. As shown in FIG. 4, according to MUSIC, it is possible to estimate a direction-of-arrival of a desired wave (0 degrees in the example shown in FIG. 4) and a direction-of-arrival of an interference wave (70 degrees in the example shown in FIG. 4).

Figure 5:
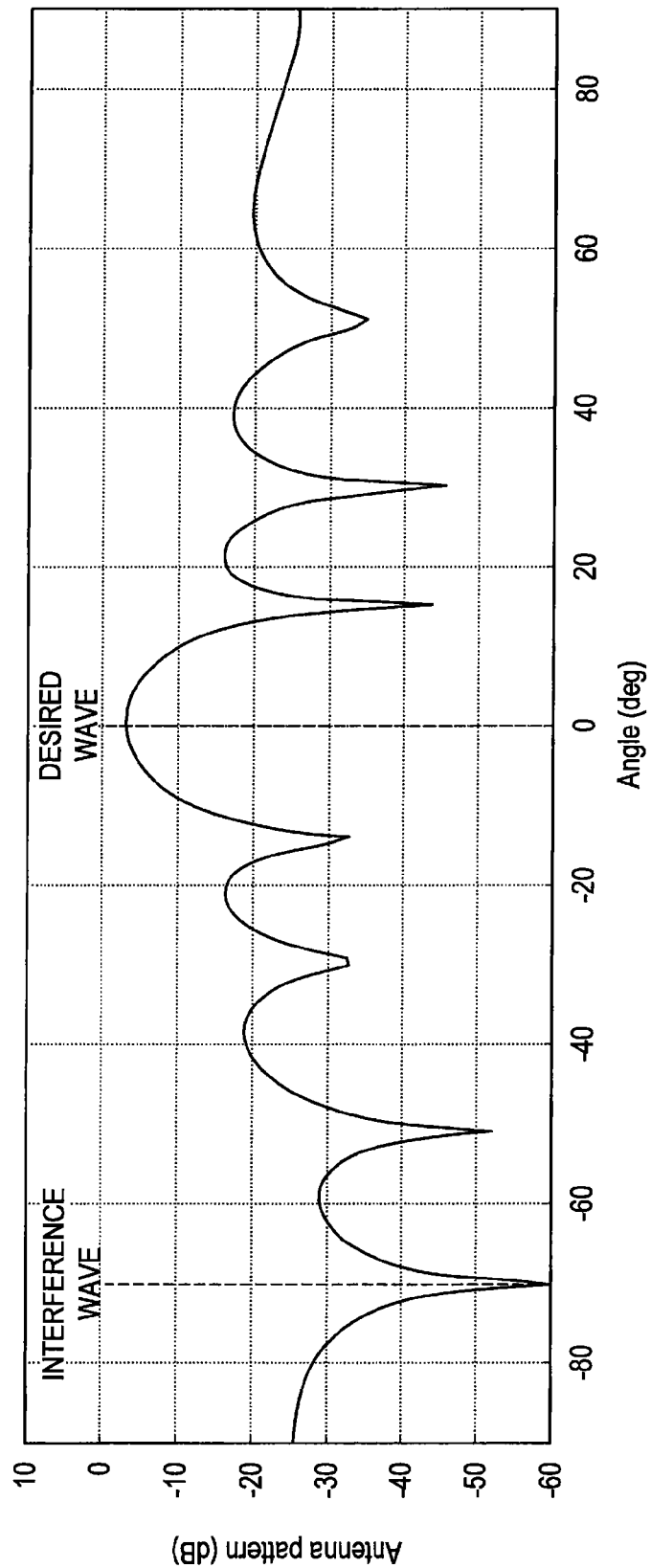
FIG. 5 is an explanatory diagram showing a detailed example of reception beam steering.

FIG. 5 is an explanatory diagram showing a detailed example of reception beam steering. As shown in FIG. 5, a null is set in the direction-of-arrival of the interference wave by reception beam steering to suppress a reception level of the interference wave, and thereby a reception gain (difference in reception level between the desired wave and the interference wave) of 55 dB is obtained in the example shown in FIG. 5.

Although the example in which the management servers 16A and 16B assign a slot through which communication for beamforming is performed has been described above, a method of performing reception beam steering is not limited to such an example. For example, the reception device 20A may receive a PBCH or a PDCCH transmitted by the transmission device 40B to know a transmission slot of the transmission device 40B, and perform reception beam steering on the basis of a signal received from the transmission device 40B through the transmission slot. Alternatively, the reception device 20A may acquire information, such as the transmission slot of the transmission device 40B or a reference pattern, from the management server 16B via the management server 16A.

Alternatively, the reception device 20A may perform reception beam steering using a reception beamforming algorithm, such as Minimum Mean Square Error (MMSE), on the basis of Recursive Least Squares (RLS) or Least Mean Squares (LMS) from the estimation results of the direction of arrival and the feature quantity.

When location information on the reception device 20A and the transmission device 40B can be acquired by a location estimation technology such as GPS, the reception device 20A may estimate the direction-of-arrival of the interference wave from the transmission device 40B on the basis of the location information on the reception device 20A and the transmission device 40B.

(Reception Beam Steering by Reception Device 20B)

On the basis of an instruction from the management server 16A or 16B, the reception device 20B performs reception beam steering for suppressing a reception level of an interference wave from the transmission device 40A according to, for example, a method described below.

First, the management server 16B assigns a slot through which the reception device 20B and the transmission device 40A perform communication for beamforming to the reception device 20B, and requests the management server 16A to assign the slot to the transmission device 40A.

The reception device 20B receives a preamble signal, a pilot signal or a reference signal transmitted from the transmission device 40A through the assigned slot, and acquires a channel matrix indicating a propagation path response between the reception device 20B and the transmission device 40A. The reception device 20B may construct a covariance matrix using the transmission signal from the transmission device 40A and use the covariance matrix as the channel matrix.

Using a direction-of-arrival estimation algorithm, such as MUSIC, and cyclostationary, the reception device 20B estimates a direction-of-arrival of the interference wave and a feature quantity of the signal, and performs reception beam steering by which a null is steered in the direction-of-arrival of the interference wave.

Although the example in which the management servers 16A and 16B assign a slot through which communication for beamforming is performed has been described above, a method of performing reception beam steering is not limited to such an example. For example, the reception device 20B may receive a PBCH or a PDCCH transmitted by the transmission device 40A to know a transmission slot of the transmission device 40A, and perform reception beam steering on the basis of a signal received from the transmission device 40A through the transmission slot. Alternatively, the reception device 20B may acquire information, such as the transmission slot of the transmission device 40A or a reference pattern, from the management server 16A via the management server 16B.

Alternatively, the reception device 20B may perform reception beam steering using a reception beamforming algorithm, such as MMSE, on the basis of RLS or LMS from the estimation results of the direction of arrival and the feature quantity.

When location information on the reception device 20B and the transmission device 40A can be acquired by a location estimation technology such as GPS, the reception device 20B may estimate the direction-of-arrival of the interference wave from the transmission device 40A on the basis of the location information on the reception device 20B and the transmission device 40A.

(Transmission Beam Steering by Transmission Device 40A)

On the basis of an instruction from the management server 16A or 16B, the transmission device 40A performs transmission beam steering for suppressing an interference level imposed on the reception device 20B according to, for example, a method described below.

First, the management server 16A assigns a slot through which the transmission device 40A and the reception device 20B perform communication for beamforming to the transmission device 40A, and requests the management server 16B to assign the slot to the reception device 20B.

The transmission device 40A receives a preamble signal, a pilot signal or a reference signal transmitted from the reception device 20B through the assigned slot, and acquires a channel matrix indicating a propagation path response between the reception device 20B and the transmission device 40A. The transmission device 40A may construct a covariance matrix using the transmission signal from the reception device 20B and use the covariance matrix as the channel matrix.

Using a direction-of-arrival estimation algorithm, such as MUSIC, and cyclostationary, the transmission device 40A estimates a direction-of-arrival of the signal from the reception device 20B and a feature quantity of the signal, and performs transmission beam steering by which a null is steered in the direction-of-arrival of the signal.

Although the example in which the management servers 16A and 16B assign a slot through which communication for beamforming is performed has been described above, a method of performing transmission beam steering is not limited to such an example. For example, the transmission device 40A may receive a PBCH or a PDCCH transmitted by the reception device 20B to know a slot through which the reception device 20B performs transmission, and perform transmission beam steering on the basis of a signal received from the reception device 20B through the slot. Alternatively, the transmission device 40A may acquire information, such as the transmission slot of the transmission device 20B or a reference pattern, from the management server 16B via the management server 16A.

Alternatively, the transmission device 40A may perform transmission beam steering using a transmission beamforming algorithm such as Minimum Mean Square Error (MMSE) on the basis of Recursive Least Squares (RLS) or Least Mean Squares (LMS) from the estimation results of the direction of arrival and the feature quantity of the signal from the reception device 20B.

When location information on the reception device 20B and the transmission device 40A can be acquired by a location estimation technology such as GPS, the transmission device 40A may estimate a direction-of-presence of the reception device 20B on the basis of the location information on the reception device 20B and the transmission device 40A.

(Transmission Beam Steering by Transmission Device 40B)

On the basis of an instruction from the management server 16A or 16B, the transmission device 40B performs transmission beam steering for suppressing an interference level imposed on the reception device 20A according to, for example, a method described below.

First, the management server 16B assigns a slot through which the transmission device 40B and the reception device 20A perform communication for beamforming to the transmission device 40B, and requests the management server 16B to assign the slot to the reception device 20A.

The transmission device 40B receives a preamble signal, a pilot signal or a reference signal transmitted from the reception device 20A through the assigned slot, and acquires a channel matrix indicating a propagation path response between the reception device 20A and the transmission device 40B. The transmission device 40B may construct a covariance matrix using the transmission signal from the reception device 20A and use the covariance matrix as the channel matrix.

Using a direction-of-arrival estimation algorithm, such as MUSIC, and cyclostationary, the transmission device 40B estimates a direction-of-arrival of the signal from the reception device 20A and a feature quantity of the signal, and performs transmission beam steering by which a null is steered in the direction-of-arrival of the signal.

Although the example in which the management servers 16A and 16B assign a slot through which communication for beamforming is performed has been described above, a method of performing transmission beam steering is not limited to such an example. For example, the transmission device 40B may receive a PBCH or a PDCCH transmitted by the reception device 20A to know a slot through which the reception device 20A performs transmission, and perform transmission beam steering on the basis of a signal received from the reception device 20B through the slot. Alternatively, the transmission device 40B may acquire information, such as the transmission slot of the transmission device 20A or a reference pattern, from the management server 16A via the management server 16B.

Alternatively, the transmission device 40B may perform transmission beam steering using a transmission beamforming algorithm such as Minimum Mean Square Error (MMSE) on the basis of Recursive Least Squares (RLS) or Least Mean Squares (LMS) from the estimation results of the direction of arrival and the feature quantity of the signal from the reception device 20A.

When location information on the reception device 20A and the transmission device 40B can be acquired by a location estimation technology such as GPS, the transmission device 40B may estimate a direction-of-presence of the reception device 20A on the basis of the location information on the reception device 20A and the transmission device 40B.

4. First Embodiment of Present Invention

Examples of methods of performing respective beam steering operations have been described above. Next, a first embodiment of the present invention for performing the above-described respective operations of beam steering stage by stage will be described in detail.

An SINR of the reception device 20B is indicated below as SINR_B, and a required SINR of the reception device 20B is indicated below as SINR_req. Also, a reception gain of the reception device 20B that is obtained when the transmission device 40A performs transmission beam steering is indicated as G_txA_BF, and a reception gain of the reception device 20B that is obtained when the reception device 20A performs reception beam steering is indicated as G_rxA_BF. Likewise, a reception gain of the reception device 20B that is obtained when the transmission device 40B performs transmission beam steering is indicated as G_txB_BF, and a reception gain of the reception device 20B that is obtained when the reception device 20B performs reception beam steering is indicated as G_rxB_BF.

For example, the reception gain G_rxB_BF of the reception device 20B that is obtained when the reception device 20B performs reception beam steering corresponds to a difference in reception level between the desired wave and the interference wave shown in FIG. 5. Also, the reception gain G_txA_BF of the reception device 20B that is obtained when the transmission device 40A performs transmission beam steering is a gain that is obtained from a reduction in an interference level imposed on the reception device 20B by the transmission device 40A.

If the transmission device 40B performs transmission beam steering, the amount of interference imposed on the reception device 20A is reduced when a radio signal is transmitted using the same transmission power, and thus the transmission device 40B can improve SINR_B of the reception device 20B by increasing the transmission power. Alternatively, since the amount of interference imposed on the reception device 20A is reduced when the transmission device 40B performs transmission beam steering, the transmission device 40A that transmits the radio signal to the reception device 20A can reduce the transmission power, and as a result, can improve SINR_B of the reception device 20B. In this way, the reception gain G_txA_BF of the reception device 20B that is obtained when the transmission device 40A performs transmission beam steering includes a gain that is obtained from an increase in the transmission power of the transmission device 40B or a reduction in the transmission power of the transmission device 40A within a range in which an SINR of the reception device 20A is not lower than a required SINR.

Also, when the reception device 20A performs reception beam steering, the SINR of the reception device 20A improves. As a result, within a range in which an SINR of the reception device 20A is not lower than the required SINR, the transmission device 40A can reduce the transmission power, or the transmission device 40B can increase the transmission power. In this way, the reception gain G_rxA_BF of the reception device 20B that is obtained when the reception device 20A performs reception beam steering includes a gain obtained from an increase in the transmission power of the transmission device 40B or a reduction in the transmission power of the transmission device 40A.

Figure 6:
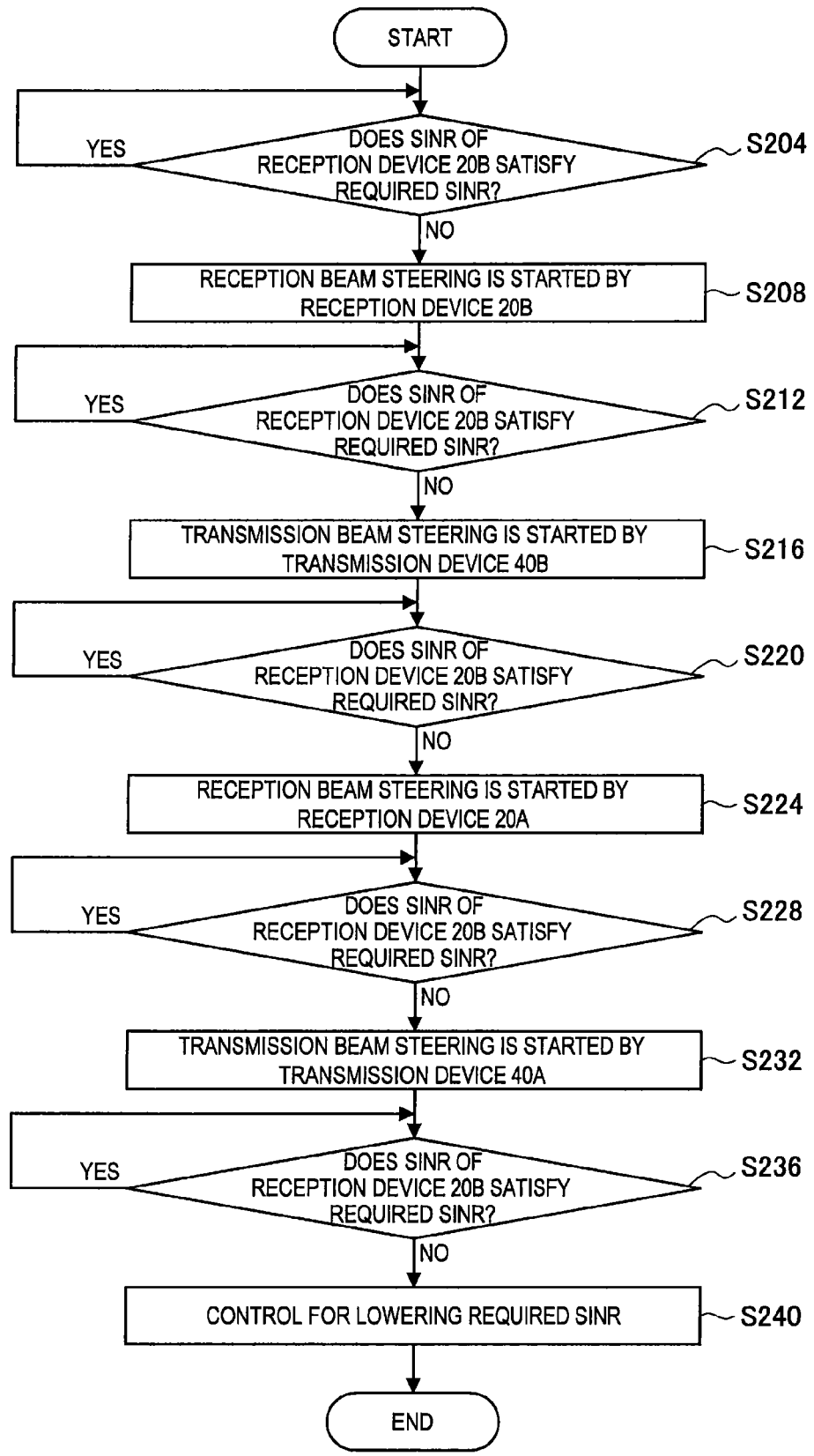
FIG. 6 is a flowchart illustrating operation according to a first embodiment of the present invention.

FIG. 6 is a flowchart illustrating operation according to the first embodiment of the present invention. As illustrated in FIG. 6, first, the management server 16B determines whether or not SINR_B of the reception device 20B reported from the transmission device 40B satisfies SINR_req of the reception device 20B (S204). A subject of each operation including the determination is not particularly limited, and for example, any one of the reception device 20B, the transmission device 40B and the management server 16A may perform each operation S212

When SINR_B is lower than SINR_req, the management server 16B instructs the reception device 20B to perform reception beam steering, and the reception device 20B starts reception beam steering (S208). Then, the management server 16B determines whether or not SINRB_BF (SINR_B.G_rxB_BF) of the reception device 20B after the reception beam steering satisfies SINR_req (S212).

When SINR_B_BF (SINR_B.G_rxB_BF) is lower than SINR_req in S212, the management server 16B instructs the transmission device 40B to perform transmission beam steering, and the transmission device 40B starts transmission beam steering (S216). Then, the management server 16B determines whether or not SINR_B_BF (SINR_B.G_rxB_BF.G_txB_BF) of the reception device 20B after the transmission beam steering satisfies SINR_req (S220).

When SINR_B_BF (SINR_B.G_rxB_BF.G_txB_BF) is lower than SINR_req in S220, the management server 16B instructs the reception device 20A to perform reception beam steering, and the reception device 20A starts reception beam steering (S224). Then, the management server 16B determines whether or not SINR_B_BF (SINR_B.G_rxB_BF.G_txB_BF.G_rxA_BF) of the reception device 20B after the reception beam steering satisfies SINR_req (S228).

When SINRB_BF (SINR_B.G_rxB_BF.G_txB_BF.G_rxA_BF) is lower than SINR_req in S228, the management server 16B instructs the transmission device 40A to perform transmission beam steering, and the transmission device 40A starts transmission beam steering (S232). Then, the management server 16B determines whether or not SINR_B_BF (SINR_B.G_rxB_BF.G_txB_BF.G_rxA_BF.G_txA_BF) of the reception device 20B after the transmission beam steering satisfies SINR_req (S236).

When SINR_B_BF (SINR_B.G_rxB_BF.G_txB_BF.G_rxA_BF.G_txA_BF) is lower than SINR_req in S236, the management server 16B performs control for lowering the required SINR of the reception device 20B (S240). For example, the management server 16B instructs the transmission device 40B to reduce a transmission rate, or lowers a QoS level. After this, the process is finished.

As described above, in the first embodiment of the present invention, beam steering is additionally performed according to a necessity in the order of reception beam steering by the reception device 20B, transmission beam steering by the transmission device 40B, reception beam steering by the reception device 20A and transmission beam steering by the transmission device 40A. In this way, by performing reception beam steering prior to transmission beam steering, cases of performing transmission beam steering that involve overhead can be suppressed.

In addition, SINR_B_BF of the reception device 20B mentioned above may be a value estimated through numerical analysis or a value measured from the reception device 20B after actual beamforming. The above-described process of FIG. 6 is performed once and then finished, but may be repeatedly performed. Also, when a predetermined period elapses at each branch (S212, S220, and the like) shown in FIG. 6, the process may be finished.

5. Second Embodiment of Present Invention

Figure 7:
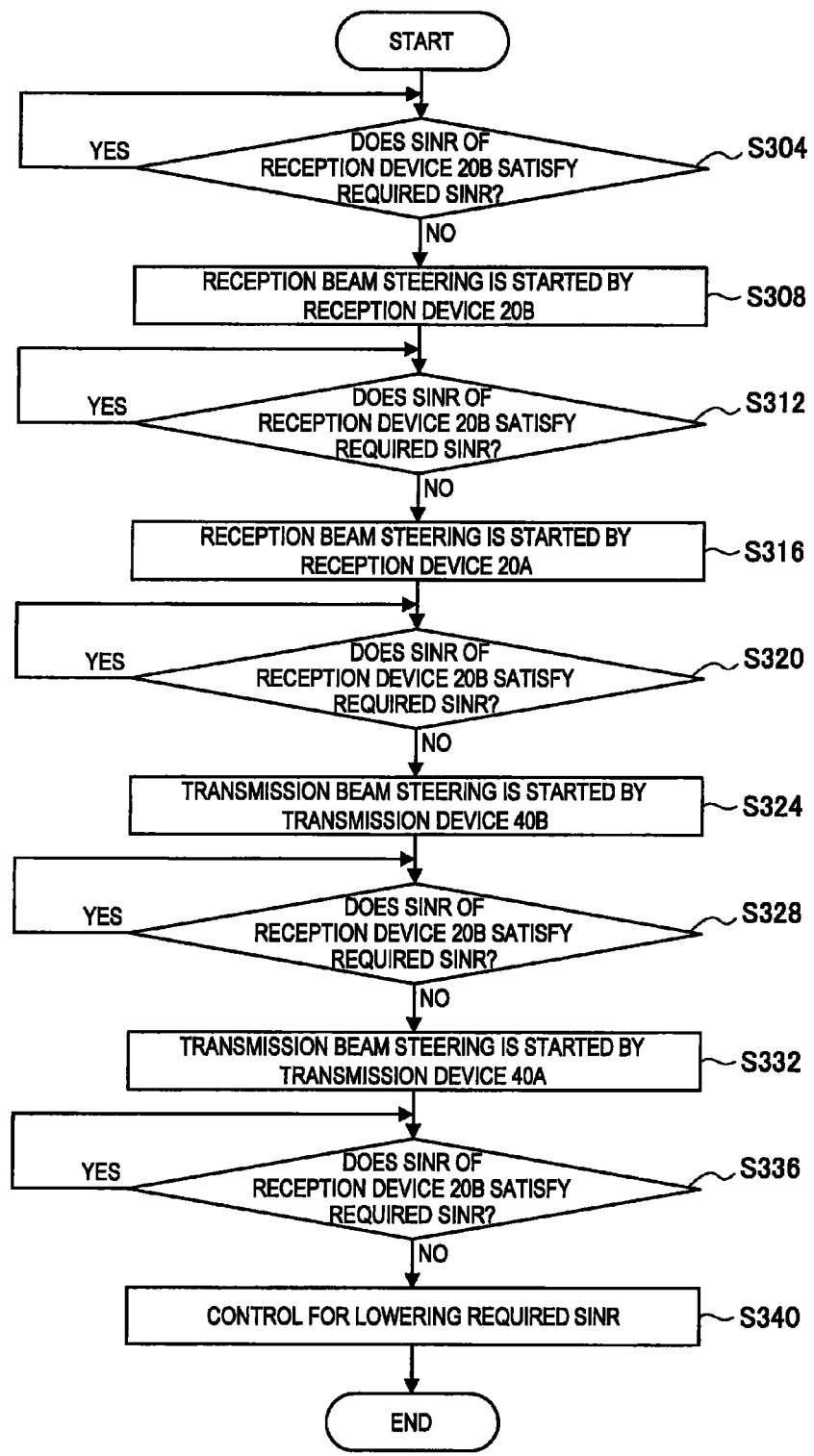
FIG. 7 is a flowchart illustrating operation according to a second embodiment of the present invention.

FIG. 7 is a flowchart illustrating operation according to a second embodiment of the present invention. As illustrated in FIG. 7, first, the management server 16B determines whether or not SINR_B of the reception device 20B reported from the transmission device 40B satisfies SINR_req of the reception device 20B (S304). A subject of each operation including the determination is not particularly limited, and for example, any one of the reception device 20B, the transmission device 40B and the management server 16A may perform each operation. S212

When SINR_B is lower than SINR_req, the management server 16B instructs the reception device 20B to perform reception beam steering, and the reception device 20B starts reception beam steering (S308). Then, the management server 16B determines whether or not SINR_B _BF (SINR_B.G_rxB_BF) of the reception device 20B after the reception beam steering satisfies SINR_req (S312).

When SINR_B_BF (SINR_B.G_rxB_BF) is lower than SINR_req in S312, the management server 16B instructs the reception device 20A to perform reception beam steering, and the reception device 20A starts transmission beam steering (S316). Then, the management server 16B determines whether or not SINR_B_BF (SINR_B.G_rxB_BF.G_rxA_BF) of the reception device 20B after the reception beam steering satisfies SINR_req (S320).

When SINR_B_BF (SINR_B.G_rxB_BF.G_rxA_BF) is lower than SINR_req in S320, the management server 16B instructs the transmission device 40B to perform transmission beam steering, and the transmission device 40B starts transmission beam steering (S324). Then, the management server 16B determines whether or not SINR_B_BF (SINR_B.G_rxB_BF.G_rxA_BF.G_txB_BF) of the reception device 20B after the transmission beam steering satisfies SINR_req (S328).

When SINR_B_BF (SINR_B.G_rxB_BF.G_rxA_BF.G_txB_BF) is lower than SINR_req in S328, the management server 16B instructs the transmission device 40A to perform transmission beam steering, and the transmission device 40A starts transmission beam steering (S332). Continuously, the management server 16B determines whether or not SINR_B_BF (SINR_B.G_rxB_BF.G_rxA_BF.G_txB_BF.G_txA_BF) of the reception device 20B after the transmission beam steering satisfies SINR_req (S336).

When SINR_B_BF (SINR_B.G_rxB_BF.G_rxA_BF.G_txB_BF.G_txA_BF) is lower than SINR_req in S336, the management server 16B performs control for lowering the required SINR of the reception device 20B (S340). For example, the management server 16B instructs the transmission device 40B to reduce a transmission rate, or lowers a QoS level. After this, the process is finished.

As described above, in the second embodiment of the present invention, beam steering is additionally performed according to a necessity in the order of reception beam steering by the reception device 20B, reception beam steering by the reception device 20A, transmission beam steering by the transmission device 40B and transmission beam steering by the transmission device 40A. In this way, in the second embodiment of the present invention, reception beam steering is performed with a higher priority than in the first embodiment, so that a case of performing transmission beam steering that involves overhead can be further suppressed.

In addition, SINR_B_BF of the reception device 20B mentioned above may be a value estimated through numerical analysis or a value measured from the reception device 20B after actual beamforming. The above-described process of FIG. 7 is performed once and then finished, but may be repeatedly performed. Also, when a predetermined period elapses at each branch (S312, S320, and the like) shown in FIG. 7, the process may be finished.

6. Conclusion

As described above, in each embodiment of the present invention, reception beam steering is performed prior to transmission beam steering, so that cases of performing transmission beam steering can be suppressed. As a result, it is possible to suppress overhead that results from calibration for transmission beam steering.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention. For example, the respective steps in the process of the communication system 1 do not have to be processed in a sequence described as a flowchart according to time. For example, the respective steps in the process of the communication system 1 may be processed in a different sequence from a sequence described as a flowchart, or in parallel. Also, a computer program for causing hardware, such as a CPU, a ROM and a RAM, embedded in the management servers 16, the transmission devices 40 and the reception devices 20 to perform the same function as the management servers 16, the transmission devices 40 and the reception devices 20 mentioned above can be written.

In addition, "secondary use" in this specification denotes performing an additional or substitutional communication service (a second communication service) using a portion or all of a frequency band assigned to a first communication service. Here, the first communication service and the second communication service may be communication services of different types or the same type. The communication services of different types may be two or more different types of communication services that are selected from a plurality of types of communication services, for example, a digital TV broadcasting service, a satellite communication service, a mobile communication service, a wireless LAN access service and a Peer-to-Peer (P2P) connection service.

Meanwhile, the communication services of the same type may include, for example, a relationship between a service based on a macro-cell provided by a communication service provider and a service based on a femto-cell managed by a user or a Mobile Virtual Network Operator (MVNO) in a mobile communication service. Also, the communication services of the same type may include a relationship between a service provided by a macro-cell base station and a service provided in order to cover a spectrum hole by a relay station (relay node) in a communication service based on Long Term Evolution-Advanced (LTE-A).

The second communication service may use a plurality of fragmented frequency bands that are aggregated using spectrum aggregation technology. Also, the second communication service may be a supplementary communication service provided by a group of femto-cells, a group of relay stations or a group of small-or-medium-scale base stations, which provide a smaller service area than a macro-cell base station, present within a service area of the macro-cell base station. The outline of each embodiment of the present invention described above can be extensively applied to all types of such secondary uses.

REFERENCE SIGNS LIST

16, 16A, 16B Management server
20, 20A, 20B Reception device
40, 40A, 40B Transmission device

The invention claimed is:

1. A communication control method comprising:
    determining whether or not reception quality of a second reception device satisfies a predetermined reference in a communication system including a first transmission device, a first reception device, a second transmission device secondarily using a frequency having been assigned to the first transmission device, and the second reception device; and
    when it is determined that the reception quality of the second reception device does not satisfy the predetermined reference, additionally performing reception beam steering by the first reception device, beam steering by the first transmission device, reception beam steering by the second reception device, or transmission beam steering by the second transmission device in a predetermined order.

2. The communication control method according to claim 1,
    wherein the predetermined order is an order of the reception beam steering by the second reception device, the transmission beam steering by the second transmission device, the reception beam steering by the first reception device, and the beam steering by the first transmission device.

3. The communication control method according to claim 2,
    wherein the reception beam steering by the second reception device is reception null-steering in a direction-of-arrival of a radio signal transmitted from the first transmission device.

4. The communication control method according to claim 3,
    wherein the transmission beam steering by the second transmission device is transmission null-steering in a direction-of-presence of the first reception device.

5. The communication control method according to claim 4,
    wherein the reception beam steering by the first reception device is reception null-steering in a direction-of-arrival of a radio signal transmitted from the second transmission device.

6. The communication control method according to claim 5,
    wherein the transmission beam steering by the first transmission device is transmission null-steering in a direction-of-presence of the second reception device.

7. The communication control method according to claim 6,
    wherein, when reception quality of the first reception device is higher than the predetermined reference due to additional performance of the reception beam steering by the first reception device, transmission power of a radio signal from the first transmission device to the first reception device is reduced within a range in which the reception quality of the first reception device is not lower than the predetermined reference.

8. The communication control method according to claim 6,
    wherein, when reception quality of the first reception device is higher than the predetermined reference due to additional performance of the reception beam steering by the first reception device, transmission power of a radio signal from the second transmission device to the second reception device is increased within a range in which the reception quality of the first reception device is not lower than the predetermined reference.

9. The communication control method according to claim 1,
    wherein the predetermined order is an order of the reception beam steering by the second reception device, the reception beam steering by the first reception device, the transmission beam steering by the second transmission device, and the beam steering by the first transmission device.

10. A communication system comprising:

a first management server for managing communication between a first transmission device and a first reception device; and a second management server for managing communication between a second transmission device, which secondarily uses a frequency having been assigned to the first transmission device, and a second reception device, wherein the second management server determines whether or not reception quality of the second reception device satisfies a predetermined reference in a communication system including the first transmission device, the first reception device, the second transmission device secondarily using the frequency having been assigned to the first transmission device, and the second reception device, and wherein, when it is determined that the reception quality of the second reception device does not satisfy the predetermined reference, the first management server or the second management server additionally performs reception beam steering by the first reception device, beam steering by the first transmission device, reception beam steering by the second reception device, or transmission beam steering by the second transmission device in a predetermined order.

* * * * *